Aug. 30, 1938.   F. L. KILLIAN   2,128,827
METHOD AND APPARATUS FOR MANUFACTURING THIN RUBBER ARTICLES
Original Filed June 24, 1930   5 Sheets-Sheet 3

INVENTOR
FRED L. KILLIAN, DECEASED,
BY FRANK B. KILLIAN, ADMX.
F. E. Shannon
ATTORNEY Aug. 30, 1938.　　　　　F. L. KILLIAN　　　　　2,128,827
METHOD AND APPARATUS FOR MANUFACTURING THIN RUBBER ARTICLES
Original Filed June 24, 1930　　5 Sheets-Sheet 4

INVENTOR
FRED L. KILLIAN, DECEASED,
BY FRANK B. KILLIAN, ADMX.
F. E. Shannon ATTORNEY Patented Aug. 30, 1938

2,128,827

UNITED STATES PATENT OFFICE 2,128,827

METHOD AND APPARATUS FOR MANUFACTURING THIN RUBBER ARTICLES

Fred L. Killian, late of Akron, Ohio, deceased; by Frank B. Killian, executor, Doylestown, Ohio; said Fred L. Killian, assignor, by mesne assignments, to Frank B. Killian, trustee, Akron, Ohio Continuation of applications Serial No. 463,379, June 24, 1930, and Serial No. 474,019, August 8, 1930. This application March 9, 1938, Serial No. 194,903

16 Claims. (Cl. 18—4)

This invention relates to the manufacture of articles by what is commonly known as the dipping process and may be adapted to various articles composed of any suitable material of a congealable liquid form or capable of being reduced to solution and deposited on a form.

This invention further relates to apparatus for automatically manufacturing articles from siccative liquids and while intended for use generally with various solutions and dispersions to any art to which it may be advantageously applied, it particularly relates to apparatus for completely producing thin dipped rubber articles from liquid latex or rubber cement in which connection it will be illustrated in the drawings and hereinafter specifically described.

The invention is particularly adapted for use in the manufacture of thin rubber articles such as rubber balloons, finger cots, nipples, rubber gloves and is adapted to be used generally in dipping rubber articles but it may be used to particular advantage in manufacturing rubber articles by dipping the forms in natural or partly coagulated rubber latex.

In the manufacture of rubber goods by the dipping process a rubber solution is first provided. This may be in the form of rubber latex partly reduced by a coagulated process to the desired consistency, or in the form of a cement consisting of rubber dissolved in naphtha or other solvent.

In practicing ordinary methods of manufacturing thin dipped rubber articles from the foregoing material the form is held in a vertical position and is dipped into the solution by vertical angular movement. The form is then withdrawn from the solution and the surplus rubber is permitted to drain therefrom, whereupon the form is inverted to permit the solution to flow away from the end of the form. This method is open to many objections, a few of which may be named as follows:

Air is trapped under the end of the form when it is lowered into the solution, causing air bubbles and resulting in a large percentage of waste. The rubber settles unevenly on the form resulting in an article of uneven thickness and the article is considerably thicker at the closed end thereof. A large quantity of rubber must be permitted to drain away leaving a very thin coating on the form, whereby the form must be successively dipped and dried to secure an article of the desired thickness. These disadvantages are considerably accentuated when natural rubber latex is used as a dipping solution.

It is among the objects of this invention to provide new and improved apparatus and a new process of manufacture which may be followed to produce articles of superior quality at a relatively low cost.

It is a further object of this invention to provide a new process of manufacture which will overcome the foregoing objections and may be followed to produce a hollow rubber article of even thickness throughout.

A still further object is to provide a new apparatus and a new method whereby a very short period of time need be allowed to permit the surplus rubber to drain from the form and which will evenly distribute a large amount of the usual drip over the form thereby providing a coating of greater thickness at each dipping; one dipping being sufficient for articles of ordinary thickness.

Another object of the invention is to provide apparatus whereby a form may be laterally entered and removed from the solution and may be held on its axis in a horizontal position or at any desired angle during the dipping and drying operations.

Another object of the invention is to provide an automatic machine of simple, durable construction which will completely manufacture articles from a siccative liquid particularly rubber articles from latex or rubber cement which will be accurate in operation and will economically produce articles of high quality having uniform characteristics and which will reduce to a minimum the loss ordinarily occasioned by articles rendered imperfect or unfit for use while undergoing the process of manufacture.

Another object is to provide a machine comprising a combination of various features and elements synchronized to cooperatively produce a complete article and arranged to be located within a completely enclosed casing without induction and eduction apertures.

A further object is to provide a machine of the character above indicated which includes improved means for supporting forms while the same are automatically presented to various elements cooperating to entirely produce an article thereon and deliver the same in completed form therefrom.

Other objects are to provide means for conveying forms through a certain path and to provide improved means for coating the forms with rubber or other substance while so conveyed, to provide improved means for securing a desired distribution of a coating on the forms while the same are so conveyed and to provide means for quickly and efficiently drying and vulcanizing the coating while the forms are being so conveyed.

An additional object is to provide improvements in various means for operating on forms and to provide a conveyor having forms mounted thereon for both rotatable and revolvable movement whereby the forms may be cleaned and coated, the coating dried, a bead rolled thereon, the articles vulcanized and removed from the forms without manual aid.

Other purposes of the invention are to provide improved form cleaning means; improved form dipping and dripping means; improved means for distributing a coating on forms; improved means for drying said coating; improved bead rolling means; improved vulcanizing means; improved dusting means; improved take off means and to provide new and improved means, for mounting and conveying forms to all of said means whereby the forms may be operatively presented to all of said means to automatically and repeatedly produce completed articles of superior quality.

The attainment of the above objects is achieved and additional objects and advantages are obtained by the novel elements, arrangement and combination of elements hereinafter described, with reference to the particular embodiment disclosed in the accompanying drawings, it being understood that the invention is not limited to the exact adaptation illustrated and changes and modifications may be made and resort had to equivalents and substitutes which come within the spirit of the invention as set forth in the appended claims.

In the drawings, like characters of reference have been employed to designate like parts as the same appear in any of the several views and in which:—

Figures 1, 13:
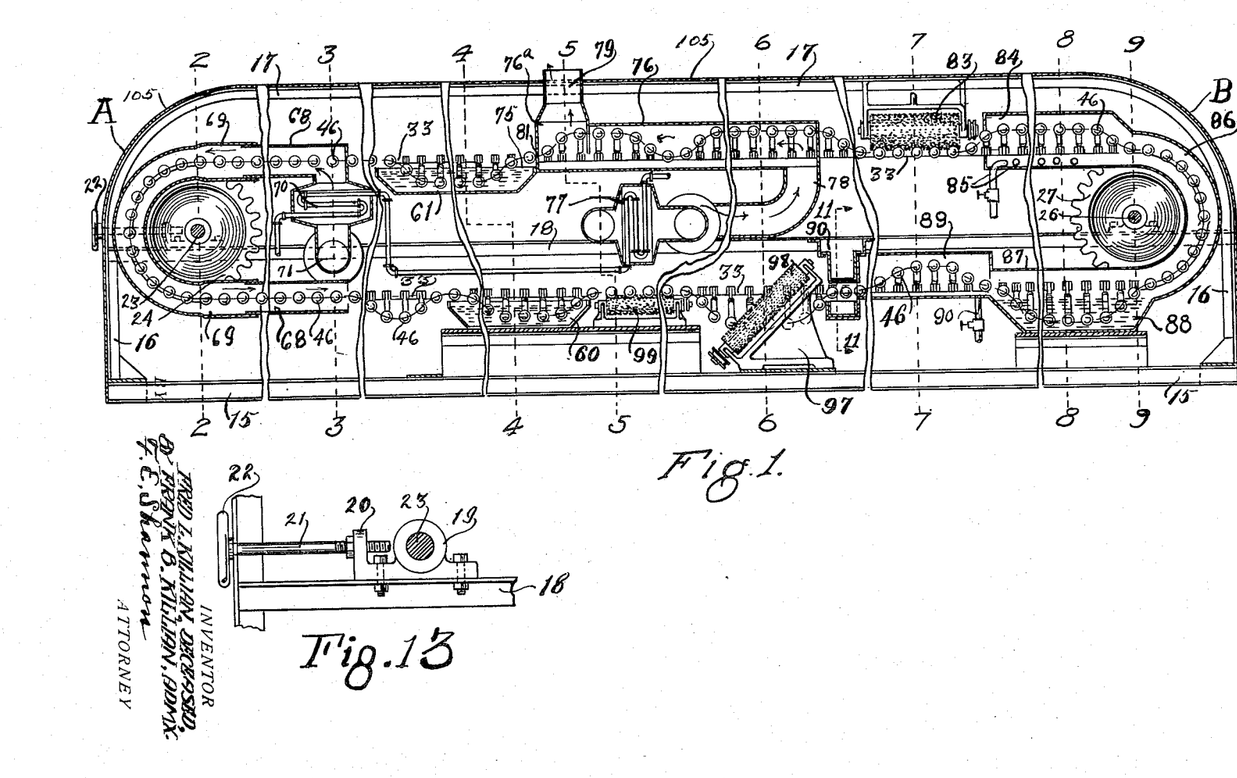
Figure 1 is a longitudinal, sectional view somewhat diagrammatic in character illustrating one form of automatic apparatus constructed in accordance with this invention, the same being shown with intervening portions broken away to conserve space and to disclose the assembled relationship of the cooperative elements.
Figure 13 is a fragmentary view showing in side elevation the adjustable bearing mounting employed in carrying out the invention.

The invention will now be described with reference to the particular adaptation thereof disclosed in Figures 1 to 13, inclusive, of the drawings in which is shown a frame having a sill or side base member 15. The frame is also provided with the usual upright members 16 which may be positioned as desired to form a structure of sufficient strength to properly mount the various elements thereon as hereinafter disclosed. The upper portions of the corner posts 16 are curved as shown in Figure 1 and merge into or are suitably secured to the top side frame members 17. The other upright members 16 extend between the sill members 15 and the top member 17. The numeral 18 denotes horizontal side members which are positioned intermediately between the sill member 16 and the top side members 17 and extend longitudinally of the frame. Suitable bearing blocks 19 are slidably mounted on the side members 18 at a point adjacent one end of the machine. This end of the machine is indicated by the character A and, for the purpose of this description will be designated as the forward end of the machine.

The reference character B will likewise designate the rear end of the machine and the forward and rearward movement or extent of the various elements will be designated accordingly. Each bearing block 19 is provided with an upward extension 20, see Figure 13, which in turn is provided with a threaded bore in which is mounted a threaded shaft 21. Each shaft 21 is rotatably mounted in a bracket on one of the corner members 16 at a forward end of the machine and each of said shafts are provided with a suitable hand wheel 22 whereby the bearing members 19 may be moved longitudinally on the slide members 18. A shaft 23 is operatively mounted in the bearing blocks 19 to extend therebetween and a sprocket wheel 24 is operatively secured on the shaft 23.

The numeral 25 (see Figure 9) denotes bearing blocks fixedly secured to the side members 18 at a point adjacent the rear end of the machine. A shaft 26 is rotatably mounted in the bearing blocks 25 and a sprocket wheel 27 is keyed or otherwise suitably fixed on the shaft 26. The shafts 23 and 26 are disposed in parallel relation and the sprocket wheels 24 and 27 are preferably similar in form and size and are disposed to operate in the same vertical plane which extends longitudinally through the machine.

The numeral 28 denotes supporting members which project upwardly in parallel, spaced relation to support the track members 29 which are disposed longitudinally of the machine. The track members 29 as shown in the drawings are composed of angle iron, but may be of any suitable construction and composed of any suitable material. The track members 29 are positioned in approximately the same horizontal plane as the lower operating peripheries of the sprocket wheels 24 and 27.

A like track composed of spaced parallel longitudinal members 30 is positioned in approximately a horizontal plane of the operating upper peripheries of the sprocket wheels 24 and 27. The members 30 are supported on suitable upright members 31 which are in turn secured to the support by cross members 32 which extend between and are supported by the side members 18. The numeral 33 denotes a sprocket chain which is operatively positioned on the sprocket wheels 24 and 27 to form endless conveying elements. The conveying elements 33 are shown in detail in Figure 10 and include a plurality of connecting links 34 which are joined by means of chains, (not shown).

Each link 34 consists of side members 35 connected by a lateral L-shaped member 36. The side members 35 converge at one end of each link to be received between the side members 35 of the opposite end of a similar link 34. The numeral 37 denotes a form carrying arm which is secured to the L-shaped member 36 by means of the bolts 38 or any suitable means. The arm 37 is off set smaller at a point adjacent each side of each link to form a track receiving notch 39. The arm 37 is positioned on the tracks 29 and 30 with the track members 29 and 30 received in the notches 39 and with the conveyor chain 33 extending midway between the tracks 29 and 30. The arm 39 projects laterally beyond the track members 29 and 30 and each arm member is provided at points adjacent each free end thereof with a bore 40. Each arm member 37 is bifurcated at each end thereof to form a seat 41 in which is hingedly mounted a form mounting member 42. The form mounting member 42 is provided with an eye 43 and is secured in the seat 41 by means of the pin 44 which extends through the bore 40 and the eye 43. The mounting member 42 is provided with a pin 42a which projects therefrom at right angles to the pin 44.

Figure 12:
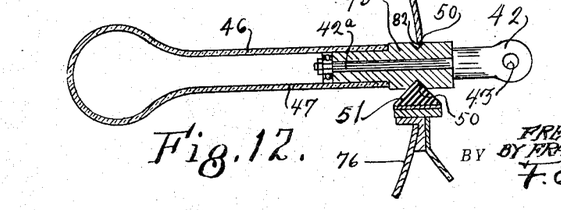
Figure 12 is an enlarged longitudinal sectional view of a form showing the manner in which the same is received in one of the drying or vulcanizing chambers.
Figures 14, 16, 17:
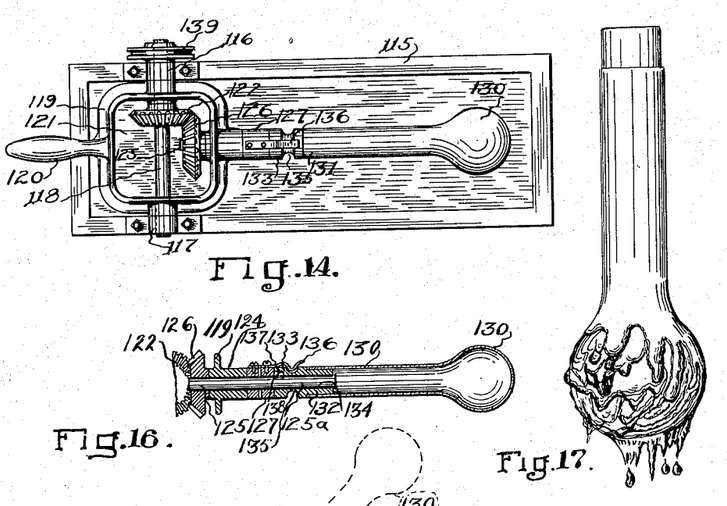
Figure 14 is a plan view of a manual dipping machine constructed in accordance with this invention.
Figure 16 is a longitudinal, sectional view of a form holder and form constructed in accordance with this invention.
Figure 17 is a view of a balloon form showing the same coated with a rubber solution and illustrating the manner in which the rubber flows thereon and therefrom during the ordinary prior dipping operation.

The numeral 45 denotes a plug which forms the base of a dipping form 46. The form 46 is provided with a hollow stem or neck portion 47 in which is fitted the outwardly projecting end of the plug 45 as shown in Figure 12. The plug 45 is provided with an axial bore 48 and a nut or other fastening member 49 is secured on the free end of the pin 44 to rotatably hold the form on the mounting member 42. The plug 45 is preferably provided intermediate its length with an annular groove 50 which is adapted to receive the contacting portion of a strip 51 as and for the purposes hereinafter described.

The shaft 26 projects laterally from one side of the machine (see Figure 9) and is provided on one end thereof with a gear wheel 52. The numeral 53 denotes a motor having a drive shaft 54 on which is mounted a pinion gear 55. The pinion gear 55 is in mesh with the gear 52 whereby the motor may be operated to rotate the spur wheel 27 and drive the conveying means 33.

In the particular adaptation of the invention shown the gear wheel 52 is operatively connected to the motor 53 whereby the conveying element will move upwardly around the outer edge of the sprocket wheel 24 and move over the upper edge of the wheel 24 toward the upper edge of the wheel 27 whereupon the conveying element will move downwardly around the outer edge of the sprocket wheel 27 and will move from the rearward toward the forward end of the machine and will be continuously received by the lower edge of the gear 24.

Figures 2, 3, 4, 5, 6, 7:
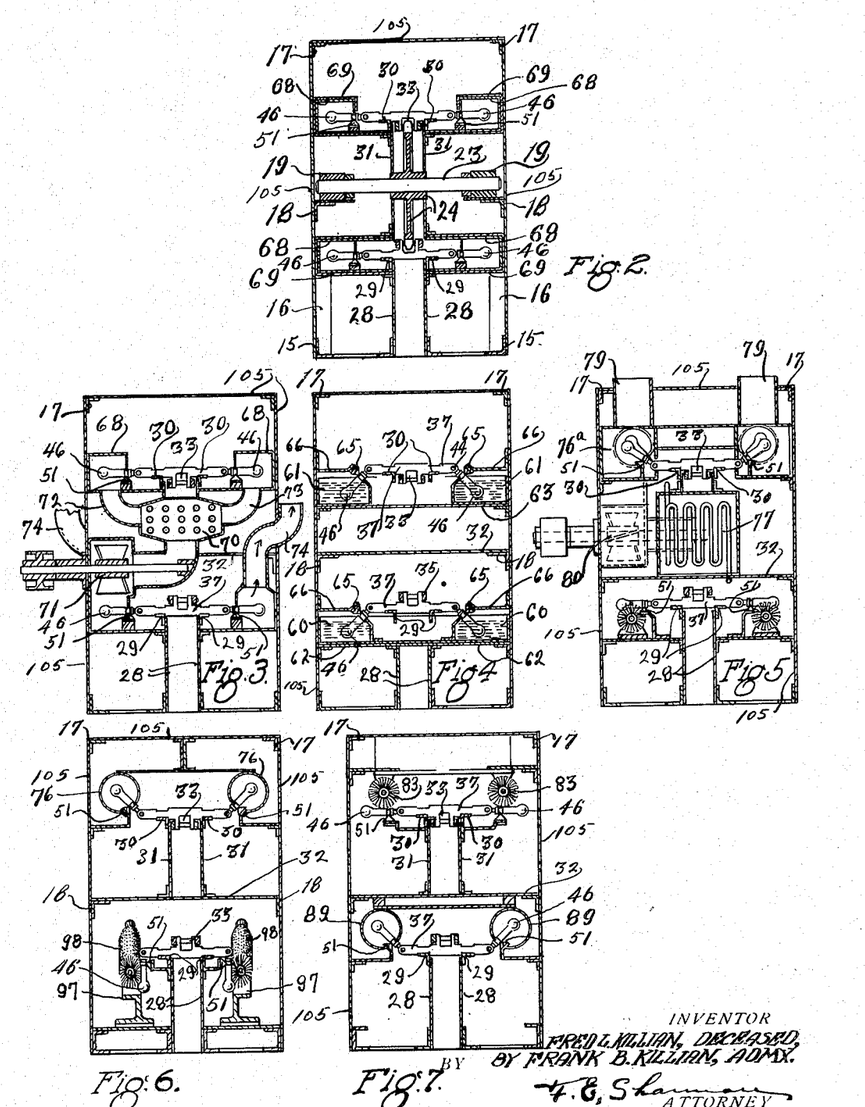
Figure 2 is a cross sectional view taken as indicated by the lines 2—2 of Fig. 1.
Figure 3 is a similar sectional view taken as indicated by the lines 3—3 of Fig. 1 and showing improved means for drying a coating deposited on dipping forms as hereinafter described.
Figure 4 is a cross sectional view taken as indicated by the lines 4—4 of Fig. 1 and illustrating improved form dipping means hereinafter specifically described.
Figure 5 is a cross sectional view taken as indicated by the lines 5—5 of Fig. 1 and illustrating the improved drying and distributing means and improved form cleaning means.
Figure 6 is a cross sectional view taken as indicated by the lines 6—6 of Fig. 1, showing the positions of the form during the drying and take off operations hereinafter described.
Figure 7 is a cross sectional view taken as indicated by the lines 7—7 of Fig. 1 showing bead rolling means and improved steaming or curing means, each forming novel elements in the invention hereinafter described.

The numerals 60 and 61 denote dipping tanks which are positioned beneath the forms 46 as shown in Figure 4. The lower tanks 60 are suitably supported by means of the cross members 62; the upper tank members 61 are likewise suitably supported by the cross members 63.

Figure 10:
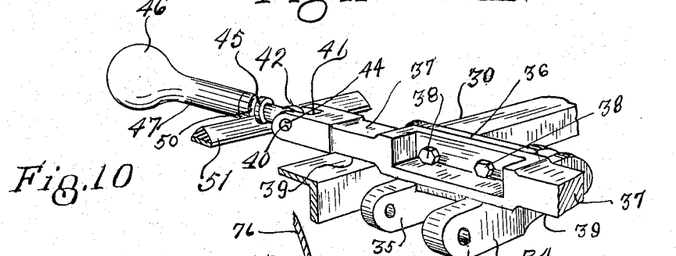
Figure 10 is a perspective view of the conveyor element employed with portions broken away and other portions shown in a somewhat diagrammatic form, the same being illustrated with the form operatively mounted thereon.

The friction strip 51 is of triangular cross section and is secured along the upper, inner edge of the tanks 60 to seat in the groove 50 in the plug 45. Like friction strips 65 are mounted on brackets 66 and are positioned above the forms 45. The friction strip 51 is positioned approximately as shown in Figure 10, when the forms are moved by the conveyor element 33 to the tank 60.

Immediately beyond the point where the forms move over the edge of the tank 60, the friction strip 51 is curved downwardly to bring the form 46 into contact with the latex or rubber cement in the tank 60. In cases where the forms 46 are hollow and buoyant the upper friction strip 65 is adjusted to force the forms 46 downwardly into the rubber solution in the tank 60. As the forms 46 are rotatably mounted on the mounting member 42 it will be seen that contact with the strips 51 and 65 cause a rotary movement of the forms while the same are in the dipping tank. The friction strip 51 is curved upwardly adjacent one end of the tank and the forms are brought to a horizontal position to permit surplus solution to drip into one end of the tank. As the forms are being rotated by frictional contact with the strip 51, the rubber or other dipping material is evenly distributed over the entire surface of the form. The strip 51 is then curved upwardly to raise the forms 46 sufficiently above the edge of the tank 61 to permit a free movement of the forms therefrom. A relatively thick solution of rubber is thus deposited on the forms and is distributed over the forms by holding the forms at different angles.

The conveyor then carries the forms 46 into the drying tubes 68, see Figures 1 and 3. The drying tubes are preferably rectangular in form and are positioned around the forms on each side of the wheel 24 so as to receive the forms 46 in a horizontal position. Each forward end of the drying tube 68 is fixedly secured to the frame and a U-shaped central portion of each drying tube surrounds and encloses the forms 46 as the same pass around the sprocket wheel 24. The U-shaped portion of the tubes 69 is telescoped into each end of the tube 68 whereby a continuous tube or chamber will be provided even when the wheel 22 is operated to move the wheel toward or from the forward end of the machine for the purpose of tightening the conveyor chains 33.

The numeral 70 (see Figures 1 and 2) denotes a radiator which forms a part of the drying element. The radiator 70 is heated by steam and a fan 71 forces air through the radiator 70 and through pipes 72 and 73, which delivers the hot air into the upper portion of the tubes 68 and forces it therethrough against the lines of movement of the conveyor 33.

The hot air will thus be first brought into contact with the forms 46 when the same are practically dry and will be forced downwardly through tubes 68 and escape through pipe 74. As the coating placed on the forms by dipping into the tank 60 is practically dry when they reach the forward end of the tube 69 the hot air supplied by the fan 70 will not become saturated with water, naphtha or other vehicle in which the rubber is dissolved or dispersed and the coating on the forms will be quickly and conveniently dried.

The forms are then presented to the dipping tanks 61 and a second coat is deposited by dipping into the tank 61. The forms are rotated by means of the friction strip 65 while forced downwardly and held in the tank 61 as hereinbefore described with reference to the dipping tank 60. As the forms 46 leave the tank they enter a drying chamber 76, see Figures 1 and 4, and are held by the strips 51 and 65 at various angles relative to the conveyor 33. A radiator 77 is operatively connected to the tube 78, and fan 80 forces air forwardly through the tube 78 into the tubes or chambers 76 in a direction opposite the direction of travel of the conveying element 33. The hot air delivered by the tube 78 travels upwardly and rearwardly through the chamber 76 and passes out through the passage 79.

The reference characters 76a, see Figures 1 and 5, denote an enlarged, rectangular chamber into which the forms 46 pass before entering the main body of the tube 76. The forward wall of the chamber 76a is provided with an opening 81 which is preferably formed to receive the forms 46 in a horizontal position. The strip 51 is then curved upwardly to enter the forms into the main chamber 76. As particularly shown in Figures 1, 6 and 12 of the drawings, each chamber 76 is composed of a cylindrical pipe having a longitudinal slot 82 formed therein. The friction strip 51 is positioned along the lower edge of this slot to support the plug 45 and cause the form 46 to continuously rotate as it is carried forward by the conveying element 33. The slot 82 is curved to tip the forms 46 to various positions whereby the coating deposited on the forms may be evenly distributed or distributed as desired over the first coating hereinbefore described.

As the forms leave the chamber 76 the coating thus deposited thereon has been evenly distributed over the surface thereof as desired and the coating on the neck portion 47 of the forms is dried sufficiently to roll a bead thereon.

The number 83, see Figures 1 and 7, denotes a bead rolling element which consists of a rotary cylindrical brush which is positioned in the path of the forms 46 as they are moved forwardly by the conveying element 33. The rotary brush 83 is preferably set at a slight incline to the line of conveyance whereby a portion of an article on one of the forms 46 will be first engaged and rolled upwardly on the form. The strip 51 is curved downwardly to bring the forms 46 into forced contact with the brush 83. While this might be done in any suitable position, in the drawings there is shown a bead rolling element in which the forms are held in a horizontal position when being moved longitudinally of the brush 83. It will be seen that the brush 83 thus rolls a bead on the article on each form.

Figure 8:
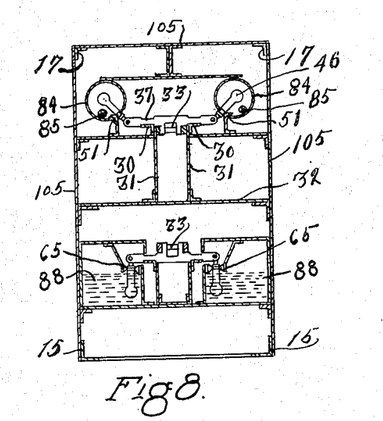
Figure 8 is a similar view taken as indicated by the lines 8—8 of Fig. 1 and illustrating a drying, heat curing element, illustrated in the upper portion of the view and a hot water or curing element in the lower portion thereof.
Figure 9:
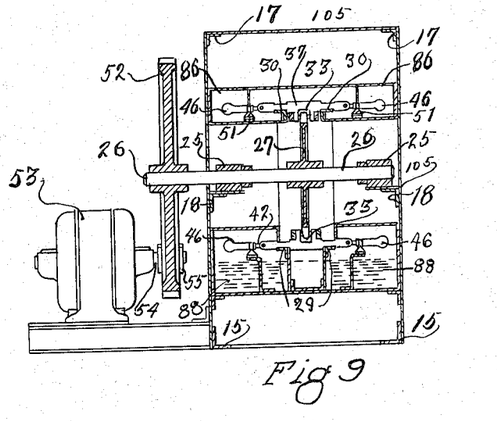
Figure 9 is a similar view taken as indicated by the lines 9—9 of Fig. 1 and showing means for driving the conveyor element hereinafter described.

The forms are carried forwardly from the bead rolling element 83 to the vulcanizing chamber 84, see Figures 1 and 8. The main body portion of the vulcanizing chamber 84 is cylindrical in shape and corresponds to the chamber 76 hereinbefore described. Steam pipes 85 are positioned in the chamber 84 and are operatively connected to a source of steam under pressure to maintain a vulcanizing heat in the chamber 84. The tube or chamber 86 which extends around the periphery of the sprocket wheel 27 is practically a continuation of the chamber 84 while the chamber 86 may be of any suitable construction, in the drawings the same has been shown of rectangular form. The chamber of tube 86 terminates at the lower peripheral edge of the sprocket wheel 27 in the chamber 87. A tank 88 is positioned in the bottom of said chamber and is adapted to hold water heated to a curing temperature. As the conveying element carries the forms 46 forwardly the plug 45 rides on the track 51 until the form 46 has been brought into contact with the water or other vulcanizing liquid in the tank 88. The track member 65 then engages the upper part of the spool and forces the forms 46 downwardly into the water in the tank 88.

The tank 88 is of sufficient length to provide a complete vulcanization of the articles thus carried therethrough by the conveying element 33. It will be noted that the forms 46 are rotated while in the water or other curing means which may be used in the tank 88. The numeral 89, see Figures 1 and 7, denotes a steam chamber which is in fact a continuation of the chamber 87 and which may be used to complete the curing process. A pipe 90 leads to the chamber 89 and is adapted to be connected to a source of steam whereby the chamber 89 may be filled with steam. The chamber 84 may be thus used to directly submit the articles on the forms to steam. This may be done to vulcanize the article, to complete the vulcanizing process or to loosen the articles from the forms.

The chamber 86 or 84 may be supplied with means for introducing or maintaining therein a vaporized, vulcanizing agent such as sulphur-chloride in which case the hot water in the vat may or may not be used in accordance with the quality or type of goods being produced. If the goods are cured by vulcanizing vapor in the chamber 84 the water in the tank 88 may be used to absorb or remove objectionable acids deposited on the articles by the vulcanizing fumes.

In case the vat 88 is used to submit the articles to the action of hot water it is not necessary to submit the forms to the action of steam in the chamber 89 for the purpose of loosening the articles from the forms. A liquid vulcanizing agent such as sulphur-chloride may be placed in the tank 88 and the articles on the forms vulcanized by immersion therein. In case a vaporized, vulcanizing agent is used or if sulphur-chloride is used in liquid form in the tank 88 it is desirable that steam be admitted to the chamber 89 to loosen the articles on the forms preparatory to submitting the same to the take-off mechanism.

Figure 11:
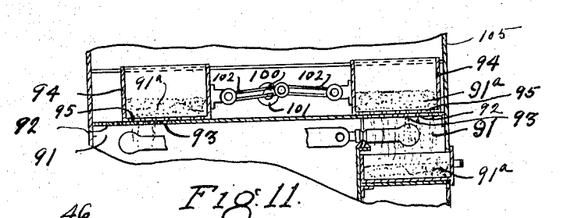
Figure 11 is a cross sectional view of the dusting apparatus which may be employed in carrying out this invention, the same being taken as indicated by the lines 11—11 of Fig. 1.

After the forms have been conveyed to the chamber 89 they are introduced into a dusting chamber 91, see Figures 1 and 11. The dusting chamber 91 is provided with a sifting device for shaking powdered starch or other known non-adhesive powder on the articles on the forms as hereinbefore set forth. As the strip 51 is in contact with the plug 45, the article will be rotated while being passed through the chamber 91 whereby the starch, talcum, or other non-adhesive powder 91a will be evenly distributed over the entire outer surface of the article on the form.

While any form of sifting device may be employed, there is shown a chamber 91 having an upper wall 92 provided with a multiplicity of closely spaced perforations 93. A sieve 94 having a screen bottom 95 is positioned on the wall 92 and means are provided for imparting reciprocatory movement to the sieve 94. The starch, talcum or other powder used will fall downwardly into a drawer or receptacle 96 whereupon it may be removed and replaced in the sieve 94.

The particular reciprocating means shown in the drawings includes a crank shaft 100 driven by a motor 101 and operatively connected to the sieve 94 by the pitmans 102. After the forms have been carried through the dusting mechanism the conveying element brings the same into operative contact with the take-off means 97. The take-off means comprises an inclined brush 98 positioned immediately adjacent the path of the forms to engage an article positioned thereon and roll the same downwardly upon itself to entirely remove the article from each form. As will be seen by examination of Figure 6, the strip 51 is positioned to contact and rotate the forms 46 while the same are in contact with the brush 98. The strip 51 is then curved upwardly to bring the forms into a horizontal position whereupon the rotating brush 99 is brought into contact with the forms to thoroughly clean the same. The brush 99 is preferably positioned at an angle to the line of conveyance whereby the wiping action of the brush will be from the base toward the free end of each form. After the forms have been thoroughly cleaned the same are carried forward to the dipping tank 60 whereupon the process herein described will be repeated to continuously form rubber balloons or other thin rubber articles.

While there is shown no particular means for driving the brushes 83, 98 and 99 it is understood that the same may be driven by a belt operatively connected by the pulleys shown on each brush or that the same may be driven by an electric motor or by any suitable means.

While there is preferred a continuous movement of the conveying means 33, it is understood that an intermittent or other suitable movement may be employed if desired. In the apparatus illustrated and described in the drawings, there is shown means for simultaneously carrying two rows of forms on a conveyor in which case it is obvious that all of the operating means herein described is in duplicate and that a description of one particular form or operating means is intended to include a description of the like means positioned on the other side of the conveying means.

In the drawings there is illustrated bead rolling means, take-off means and form cleaning means, each employing a single rotating brush, but it is understood that the forms may be driven between two brushes if desired. It is also to be understood that any suitable rolling or brushing element may be substituted for the brushes 83, 98 and 99.

The entire mechanism herein described is completely enclosed in a casing which, in the particular adaptation shown in the drawings, is formed by suitably securing sheet metal 105 around the frame members 16, 17 and 18. The invention thus provides completely enclosed means for manufacturing rubber balloons and other thin rubber articles. The apparatus is automatic as supply tubes leading to the tanks 60, 61 and 88 may be employed to maintain the desired amount of liquid therein and chutes may be provided which lead from the take-off mechanism 97 to deliver the finished articles from the machine.

It will thus be seen that the apparatus herein disclosed may be operated to receive liquid rubber latex, rubber cement or other dipping solution and deliver completely finished articles without any manual operations. As the machine is completely enclosed the articles will be free from dust and atmospheric conditions thus eliminating a large amount of defective goods which are produced by ordinary apparatus.

It is obvious that the speed of rotation of the forms 46 may be changed by changing the diameter of the plug 45 or the portion thereof which is engaged by the friction strips 51 or 65. The nature of the goods, the consistency of the solutions or a particular operation may require a more rapid rotation of the forms in which case the element 51 or 65 may be provided in the nature of a power driven belt and the forms rotated, in the desired direction during particular operations at the required speed.

While the forms 46 are shown separatively mounted on the conveyor element 43 the forms may be mounted in groups or carried by a board or other mounting member which may be conveyed to the operating means and tipped or otherwise moved to position the forms as herein set forth.

In the foregoing description and in the appended claims the specification of a movement of one element as relates to other elements is intended to include the relative movement therebetween to accomplish the desired result.

It is not intended that the invention be confined to the specific form of swinging and rotating means shown, as the forms may be moved to accomplish the desired result by engaging the form mounting members and may be rotated by gears or other suitable means.

It is obvious that the cam strips 51 and 65 may be otherwise positioned and may engage any part of the form mounting members to move the same to the positions herein described.

With reference to Figures 14 to 24, inclusive, of the drawings there is illustrated manually operable apparatus in connection with which the present invention relating to the dipping of forms may be practiced.

As shown in these figures of the drawings, this apparatus consists of a container or dipping tank 115. The bearing blocks 116 and 117 are mounted on the upper edge of the tank 115. A shaft 118 is mounted in suitable bearings in the blocks 116 and 117.

The numeral 119 denotes a frame which is positioned between the blocks 116 and 117 and is provided with suitable bores in which the shaft 118 is positioned. The frame 119 is provided at one end thereof with a handle 120 whereby it may be rotated on the shaft 118. The frame 119 is provided with a suitable cavity 121 and a beveled pinion 122 is positioned therein and is keyed or otherwise secured to the shaft 118. The frame is provided on the side opposite the handle with a boss 124 and a shaft 125 is journalled in said boss so as to project therethrough. The inwardly projecting end of the shaft is provided with a beveled gear 126 which is in mesh with the beveled gear 122.

The numeral 127 denotes a collar which is fixedly secured to the shaft 125 and which is positioned against the axial face of the boss 124. The shaft 125 terminates at the outer end thereof in an outwardly projecting pin 125a. The forms 130 as shown in the drawings are composed of glass and are provided with a long, narrow neck. The form is open at the neck and a plug 132 on the spool 133 is secured therein.

The spool 133 is provided with an axial bore 134 adapted to receive the pin 125a. The spool is provided intermediate its length with circumferentially extending groove 135. A spring 136 is secured to the collar 127 and is fixed to snap into the groove 135 to retain the forms 130 on the pin 125a. The collar is provided with a suitable dowel 137 which is adapted to be entered in the bore 138 in the base of the spool 133, whereby a rotary movement of the shaft 125 will cause a like movement of the shaft 130. Any suitable means may be employed for driving the shaft 118. In the drawings there is shown a pulley 130 which is adapted to be operatively connected by a driving belt to a source of power.

In use, a quantity of solution 140, say liquid rubber latex, is placed in the tank 115. A form 130 is placed on the pin 125 and is detachably held thereon by means of the spring 136. The form is rotated at the proper speed which will vary in accordance with the consistency of the solution and in accordance with the result desired. The handle 120 is manipulated to dip the form in the latex 140 as shown by dotted lines in Figure 15. As the form 130 is rotated on its axis it may be entered sidewise into the solution, the rotary movement being sufficient to carry air bubbles away from the under side of the form. As the form is rotated, it will be coated if only one side thereof is in contact with the latex. The handle 120 is then operated to remove the form 130 from the latex and it is held for a very short period of time in a position immediately above the surface of the solution to permit the surplus material to drip therefrom. The form is then swung to a horizontal position and to an upwardly inclined position shown by dotted lines in Figure 15 to evenly distribute the surplus solution over the entire form. As the form is rotated, a relatively large amount of solution is retained on the form, thus producing an even coat of unusual thickness.

While in the apparatus shown in Figures 14 to 24, inclusive, the form cannot be completely revolved it is to be understood that a completely revolvable movement may be made if desired and that the form may be held at any angle necessary to evenly distribute the solution thereon. The term "revolvable movement" is used in a broad sense and is intended to include any movement which may be made to bring the form into the desired positions.

Figures 15, 18:
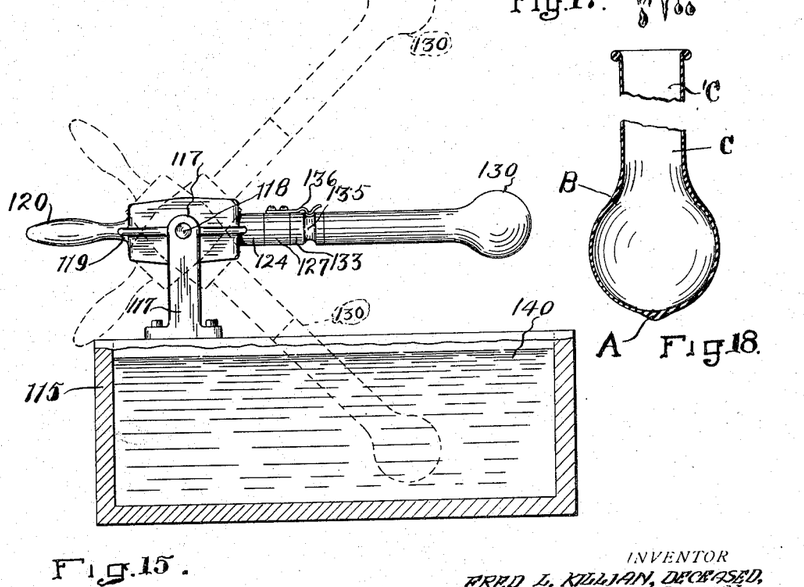
Figure 15 is a side elevational view of the same, the side wall being removed to more clearly illustrate the invention and parts being shown by dotted lines to indicate the various positions in which the forms are held during the dipping operation.
Figure 18 is a similar, longitudinal sectional view of a balloon manufactured in practicing ordinary methods by the use of ordinary apparatus.
Figures 19, 20:
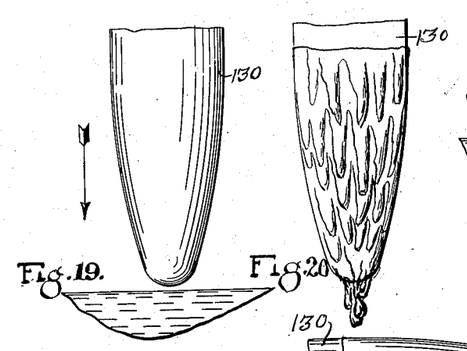
Figure 19 is a view of a finger cot form as the same is ordinarily presented to the dipping solution, a portion of the solution being shown in section.
Figure 20 is a side elevational view of a finger cot form showing the manner in which the surplus solution is ordinarily permitted to drip therefrom after the dipping operation.
Figure 21:
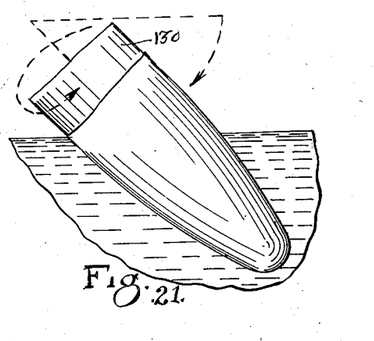
Figure 21 is a side elevational view of a finger cot form showing the manner in which the same may be dipped into a rubber solution by the improved method and apparatus herein described.
Figures 22, 23, 24:
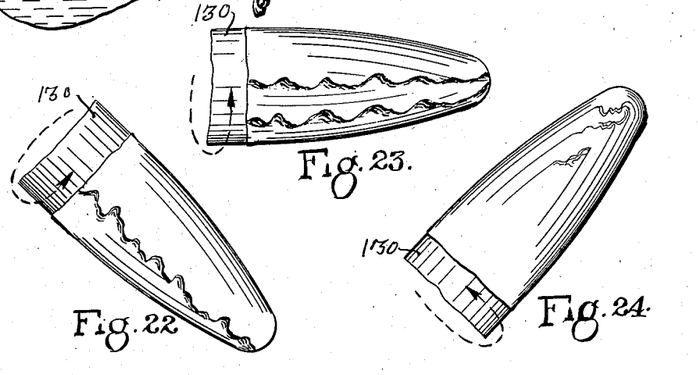
Figure 22 is a side elevational view showing one position in which the forms may be held during the dripping operation.
Figure 23 is a similar view showing the form in a horizontal position.
Figure 24 is a similar view showing the form positioned at an upward inclination.

While in Figure 15 there is shown the form in a horizontal position and there is shown two positions indicated by dotted lines, it will be understood that these positions are merely indicative of the process and that the form must be moved to the other positions and in some instances the form must be moved successively to and from some of the positions, the exact positions dependent on the exact shape of the form, the consistency of the dipping stock and the result desired.

Particular attention is called to the fact that the invention entirely eliminates the thick drop A and the thick shoulders B shown on the balloon C in Figure 18. Heretofore it has been found impossible to form articles of liquid latex without the thick spot A at the closed end of the form. It will be seen that the process herein described may be followed to produce goods having a wall of even thickness, the walls formed thicker in some places if such construction is desired.

The term rubber solution or dipping solution used in this specification and claims is understood to include rubber cement, rubber latex in its natural or condensed form and any solution or dispersion of rubber adapted to be used for coating forms to build a rubber article thereon. The term horizontal position used in describing the movement of the forms shall be considered in a broad sense and is understood to include positions transverse to the vertical which will accomplish the desired result.

This application is a continuation of application 463,379 filed June 24, 1930, and 474,019 filed August 8, 1930.

Having thus illustrated the invention and described the same in detail, what is claimed as new and desired to secure by Letters Patent is set forth in the appended claims:

1. In apparatus of the character indicated a track comprising two parallel rails, a conveyor mounted between said rails for movement longitudinally thereof, arms secured to said conveyor, said arms slidably contacting with said rails, a form mounting member hingedly secured to each end of each arm, a form rotatably secured on each mounting member, means to move the forms to different angular positions relative to said conveyor, and means to rotate the forms.

2. In an apparatus of the character indicated a conveyor, arms projecting from each lateral side thereof, a form mounting member hingedly secured on each arm and a form rotatably mounted on each mounting member.

3. In apparatus of the character indicated, a conveyor, arms projecting from each lateral side thereof, a form mounting member hingedly secured on each arm, a form rotatably mounted on each mounting member and an undulating strip disposed longitudinally of said conveyor, said strip positioned to frictionally engage the bases of said forms to move the same to different angular positions relative to said conveyor and to rotate the forms.

4. In means for presenting forms in different positions to operating means, a conveyor chain having arms projecting transversely from each side thereof, form mounting members hingedly secured to the free ends of said arms for swinging movement on axes disposed in parallel relation to the line of conveyance, forms mounted on said mounting members for rotary movement on axes disposed transversely to the axes of said mounting members, strips disposed longitudinally of said conveyor, said strips located to engage the base of said forms to rotate the same and to move the forms to various operating positions.

5. In apparatus of the class specified, a conveyor, arms projecting therefrom, a form mounting member hingedly mounted on each arm and forms secured to said mounting member.

6. Apparatus for use in making thin dipped rubber articles comprising an endless conveyor, a plurality of form assemblies attached to the conveyor, each assembly including a form of the desired definite size and shape rotatable about axes extending transversely and longitudinally of the conveyor, and members disposed along the conveyor and engageable with the form assemblies during movement of the conveyor for varying the angularity of the forms throughout a predetermined range extending from well below to well above a horizontal plane and for simultaneously rotating the forms during such variation of angularity whereby the forms may be dipped to a uniform predetermined extent into liquid rubber material disposed adjacent to the conveyor and the rubber material so placed thereon may be distributed over the dipped portion of the form to provide a hollow rubber article of the desired wall thickness in its various parts.

7. Apparatus for use in making thin dipped rubber articles comprising an endless conveyor, a plurality of form assemblies attached to the conveyor on opposite sides thereof, each assembly including a member pivoted to the conveyor to move about an axis parallel with the conveyor, and a form of the desired definite size and shape carried by said members to rotate about an axis extending transversely of the conveyor, and members disposed along the conveyor and engageable with the form assemblies to rotate the forms and to tilt them from above to below a horizontal plane while the forms are being conveyed into, through and out of a tank of liquid rubber material, through a drying chamber and through a bead roller all disposed along the conveyor.

8. Apparatus for use in making thin dipped rubber articles comprising an endless conveyor, a plurality of form assemblies attached to the conveyor, each assembly including a member pivoted to the conveyor to move about an axis parallel with the conveyor, and a buoyant form of the desired definite size and shape carried by said member to rotate about an axis transversely of the conveyor, fixed undulating means disposed along the conveyor and engaging the under side of the form assemblies to rotate the forms and to vary their angularity above and below a horizontal plane, and means above and engageable with the top side of the form assemblies to submerge the buoyant forms to a definite predetermined extent into liquid rubber material adjacent to the conveyor.

9. The method of making thin hollow dipped rubber articles which includes the steps of moving a form of the desired definite size and shape in a direction substantially at right angles to its longitudinal axis through a body of liquid rubber material while rotating the form and submerging it in the liquid to a predetermined definite extent, removing the form from the liquid and, while exposing the liquid on the form to drying conditions, simultaneously rotating and varying the angularity of the form from below to above a horizontal plane to obtain the desired distribution of rubber material thereon.

10. The method of making thin hollow dipped rubber articles which includes the steps of dipping a predetermined portion of a form of the desired definite size and shape into the surface portions of liquid rubber material while rotating the form and moving the form at right angles to its longitudinal axis, removing the form from the liquid, rotating and varying the angularity of the dipped form from below to above a horizontal plane to obtain the desired distribution of rubber material on the form, and subjecting the rubber to drying conditions to set the rubber while in the desired distribution, rolling a bead on the open end of the article and subsequently vulcanizing the rubber and finishing the article.

11. Method of preparing thin rubber articles using dipping forms, wherein the forms are given a rotational movement about their axes and at the same time can be given a swinging from the upward vertical direction to the downward vertical direction through a horizontal direction, characterized by the fact that the forms are positively driven and are swung in a controlled manner so that they can remain a desired time either in the horizontal or the upward or downward vertical positions, or in a desired inclined position between said positions.

12. That method for making thin dipped articles of vulcanized rubber of definite size and shape directly from liquid latex or the like which comprises passing a form of the desired size and shape through a body of latex with the form extended into the latex with its axis at an angle to the surface thereof and simultaneously rotating the form about said axis to deposit a film of rubber on said form, drying said film on the form, the rubber in said film being vulcanized before removal of the article from the form and then stripping the article from the form.

13. That method for making thin dipped articles of vulcanized rubber of definite size and shape directly from liquid latex or the like which comprises passing a form of the desired size and shape through a body of latex with the form extended into the latex with its axis at an angle to the surface thereof and simultaneously rotating the form about said axis to deposit a film of rubber on said form, drying said film on the form while continuing to rotate the form about said axis after it passes from the latex until the rubber in the film has set, the rubber in said film being vulcanized before removal of the article from the form and then stripping the article from the form.

14. That method for making dipped rubber articles directly from liquid latex or the like which comprises passing a form through a body of latex, said form being extended into said body with its axis at an angle to the surface thereof, passing said form out of said body of latex and thereafter simultaneously rotating said form about its axis and oscillating said form between positions in which its axis extends at angles above and below the horizontal until the film of rubber deposited on the form has set.

15. The method of making rubber articles directly from liquid latex or the like which includes the steps of dipping a form in a body of the liquid, said form being extended into the liquid with its axis at an angle to the liquid, removing the form from the liquid and moving the form so as to cause circumferential movements and axial movements in both directions of the liquid on the form until the liquid sets to produce a rubber body having walls of uniform thickness.

16. That method for making thin dipped articles of vulcanized rubber of definite size and shape directly from liquid latex or the like which comprises passing a form of the desired size and shape into a body of latex with the form extended into the latex with its axis at an angle to the surface thereof and simultaneously rotating the form about said axis to deposit a film of rubber on said form, passing the form out of the latex at an oblique angle to the surface thereof while continuing such rotation of the form, drying said film on the form, the rubber in said film being vulcanized before removal of the article from the form, and then stripping the article from the form.

FRANK B. KILLIAN,
*Executor of the Estate of Fred L. Killian, Deceased.*